United States Patent [19]

Damiron et al.

[11] Patent Number: 4,684,451
[45] Date of Patent: Aug. 4, 1987

[54] PROCESS AND DEVICE FOR BRINGING A STRIP TRAVELING IN A LIQUID INTO CONTACT WITH A DIVERTING ROLL

[75] Inventors: Pierre M. Damiron; Jean-Luc Legoupil, both of Paris, France

[73] Assignee: Clecim, Courbevoie, France

[21] Appl. No.: 858,190

[22] PCT Filed: Jul. 25, 1985

[86] PCT No.: PCT/FR85/00206
§ 371 Date: May 22, 1986
§ 102(e) Date: May 22, 1986

[87] PCT Pub. No.: WO86/00939
PCT Pub. Date: Feb. 13, 1986

[30] Foreign Application Priority Data

Jul. 26, 1984 [FR] France ............... 84 11860

[51] Int. Cl.⁴ ............................... C25F 1/00
[52] U.S. Cl. .................................... 204/141.5
[58] Field of Search .............. 204/140, 141.5, 145 R

[56] References Cited

U.S. PATENT DOCUMENTS 3,097,971  7/1963  Skipton .................. 134/15
4,441,975  4/1984  Carter ................... 204/206

FOREIGN PATENT DOCUMENTS 2147182  3/1973  Fed. Rep. of Germany ...... 204/206

OTHER PUBLICATIONS

Journal of the Iron and Steel Institute, vol. 201; No. 5, May 1963, W. G. Jaffrey et al.: "The Support of Thin Steel Strip on Air Cushions", see pp. 401–407.

Primary Examiner—T. M. Tufariello
Attorney, Agent, or Firm—Pollock, Vande Sande & Priddy

[57] ABSTRACT

Process and apparatus for degreasing and cleaning metal strips (3) traveling at high speed in a liquid (2) by bringing them into contact with a diverting roll (4). The roll (4) has a surface of contact with the strip (3) which comprises circumferential grooves (18). A gas is introduced into the liquid (2) in the vicinity of the surface of the roll (5) so that the fluid entrained between the strip (3) and the roll (4) is a compressible mixture of liquid and gas. In particular, when the liquid (2) is an electrolyte, the gas release can be produced by means of electrodes (10, 11). A hood (12) enables the gas released to be retained in the vicinity of the contact surface of the roll.

5 Claims, 4 Drawing Figures

PROCESS AND DEVICE FOR BRINGING A STRIP TRAVELING IN A LIQUID INTO CONTACT WITH A DIVERTING ROLL

The invention relates to a process and a device for bringing a strip traveling at a high speed in a liquid into contact with a diverting roll, which make it possible to avoid the formation of a liquid layer interposed between the strip and the roll.

In electrolytic degreasing of a metal sheet or a metal band, for example, an attempt is made to pass this strip at a very high speed between electrodes immersed in a reactive liquid used as an electrolyte. This electrolyte may be, for example, an alkaline solution and, in this case, the electrodes produce a release of hydrogen or oxygen gas on the faces of the metal sheet as it passes between the electrodes, this metal sheet itself forming an electrode of opposite sign to the fixed electrodes between which it travels. The gas release considerably accelerates the degreasing in the reactive liquid, with the result that it is possible, when the operating conditions have been suitably chosen, to pass the strip of metal sheet or of metal band at a very high speed through the electrolyte, between the electrodes.

The electrolyte is generally held in a tank in which the electrodes are immersed and in which means are provided for guiding the metal sheet as it travels through the electrolyte. Such means consist, in particular, of diverting rolls which make it possible to change the direction of travel of the metal strip. This metal strip is driven at a high speed and is subjected to a degree of lengthwise traction which enables the diverting rolls to be partly enclosed by exerting a certain radial force on these rolls and to control its position between the electrodes accurately during its passage.

Now, it has been observed that above a certain speed of the strip, in the region of 500 m/min, an actual and efficient contact between the strip and the diverting roll no longer takes place, and this is reflected in poor guiding of the strip, which "floats" over the surface of the roll, and an inadequate coupling between the roll and the strip, especially when the former is responsible for applying traction to the strip and/or driving it.

This loss of contact between the strip and the roll is due to the fact that some of the liquid is entrained into the contact zone between the strip and the surface of the roll and forms a layer of liquid which reduces adhesion. This phenomenon, known as "aquaplaning" is all the more noticeable the higher the speed of the strip. In practice, this phenomenon prohibits the use of speeds of travel of the metal strip which are greater than 500 m/min in electrolytic degreasing tanks.

To overcome this phenomenon, it has been proposed to machine circumferential grooves on the side surface of the diverting rolls, a result of this being to reduce the aquaplaning between the strip and the roll owing to a phenomenon which is somewhat similar to that underlying the improved adhesion of rain tires with special patterns on automobile vehicles. Using grooved diverting rolls it has been possible to raise the limiting speed of the metal strips in electrolytic degreasing plants to a value of between 600 and 700 m/min.

However, the aquaplaning reappears above this speed, and this correspondingly limits the potential of electrolytic degreasing plants.

The purpose of the invention is consequently to provide a process and a device which make it possible to keep the strip perfectly applied to the roll, even at very high travel speeds, for example above 700 m/min.

To this end, a certain quantity of a gas which is insoluble in the liquid and capable of mixing with the entrained part of the liquid is introduced in the vicinity of the roll surface, and at least upstream of the contact zone between the strip and the roll, to form a fluid which is compressible in the contact zone between the strip and the roll.

The quantity of gas which is introduced must merely be sufficient to make the fluid entrained into the contact zone sufficiently compressible to maintain perfect contact between the strip and the roll.

The gas may be introduced by direct injection in the vicinity of the roll surface under a pressure which is just greater than the hydrostatic pressure of the liquid at the injection point.

However, it is especially advantageous to produce the gas directly in the required location by means of electrolysis. For this purpose, it may be sufficient to use a single electrode immersed in the liquid, in the vicinity of the strip, immediately upstream of the contact zone.

To make the invention properly understood, a description will now be given, by way of an example which is not intended to be limiting in nature, with reference to the attached figures, of an example of the use of the process according to the invention, in a plant for electrolytic degreasing of a metal strip.

Figure 1:
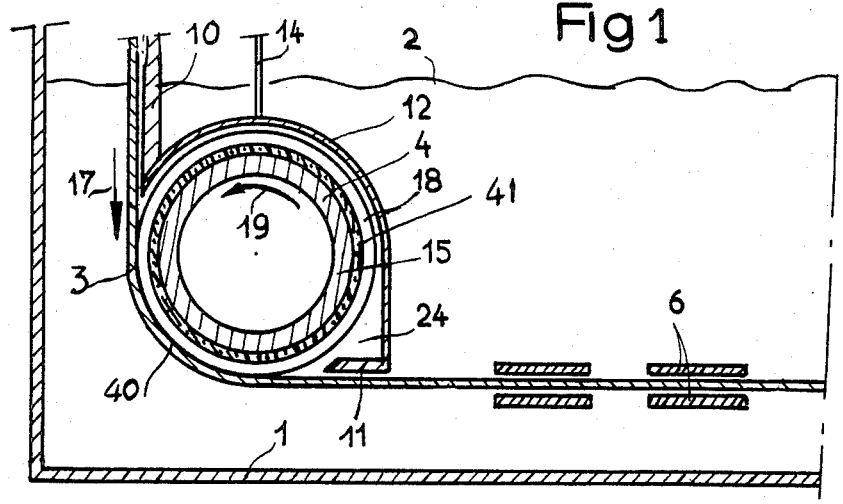
FIG. 1 is a view in cross-section taken in a vertical plane of the entry part of an electrolytic degreasing tank for making use of the process according to the invention and according to a first embodiment.

FIG. 1 shows the entry part of an electrolytic degreasing tank 1 filled with an alkaline solution up to level 2. A metal strip 3 arriving from a plant arranged upstream of the electrolytic degreasing enters the electrolytic liquid with a vertical direction of travel. This strip 3 passes over a diverting roll 4 with a horizontal axis, mounted inside the tank 1 and completely immersed in the electrolytic liquid.

The strip 3 partially encloses the roll 4 over a contact zone 40 and is kept under traction, so as to remain in contact with the roll 4 as it travels at a high speed through the tank.

Downstream of the roll 4, the strip 3 passes between 2 planar and parallel electrodes 6, arranged in several successive banks over the pathway of the strip.

According to a preferred embodiment of the invention, additional planar electrodes 10 and 11 are arranged opposite the face of the strip 3 which comes into contact with the roll 4, immediately upstream and immediately downstream, respectively, of the zone of contact 40 with the roll. These electrodes are connected mechanically and electrically by a hood 12 which encloses the roll 4 over its part 41 which is not covered by the strip 3.

The electrodes 6, as well as the electrodes 10 and 11, are supplied with electric current and are connected for this purpose to one of the terminals of an electric generator, whose other terminal is connected to a conductive component in contact with the strip 3, upstream of the degreasing tank 1. In particular, the electrodes 10 and 11 are supplied by an electric cable 14 connected to the hood 12.

The strip 3, on the one hand, and the electrodes 10, 11 and 6, on the other hand, thus form opposite electrodes between which electrolysis of the alkaline solution held in the tank 1 takes place. Thus, when the strip passes through the tank, a release of gas is produced on the strip 3, on the one hand, and on the electrodes 10, 11 and 6, on the other hand.

Figure 2:
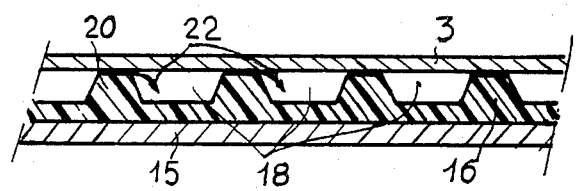
FIG. 2 is a view in partial lengthwise section of a diverting roll immersed in the degreasing tank shown in FIG. 1.

With reference to FIGS. 1 and 2, it can be seen that the roll 4 consists of a metal shell 15 covered with a rubber coating 16 which resists the alkaline solution. In a known manner, the outer surface of this coating, which forms the side contact surface of the diverter roll 4 comprises circumferential grooves 18 at distances from each other and distributed over the length of roll.

The gas produced on the electrode 10 and on the strip 3 immediately upstream of the roll 4 is entrained with a certain quantity of electrolyte between the strip 3 and the grooved side surface of the roll 4, during the travel, at a very high speed, of the strip 3 in the direction of the arrow 17, and of the roll 4 in the direction of the arrow 19. It is known that this results in entrainment of a part of the liquid which enters the contact zone 40 between the strip and the roll, and especially into the grooves 18 in the side surface of this roll. The radial forces exerted between the roll and the strip 3 result in the strip being plated onto the roll; they displace and compress the entrained liquid which, until now, could therefore form a layer eliminating the adhesion between the top of the corrugations 20 separating the grooves 18 and the strip 3, towards the inner space of the grooves 18, in the direction of the arrows 22. By virtue of the invention, this phenomenon does not occur because, when the strip and the roll are driven at a very high speed, the fluid forming the layer which would tend to form in the contact zone 40 has become compressible, since it consists of a mixture of a gas and of a liquid. This compressible fluid can therefore be easily displaced and compressed in the inner space of the grooves 18, which was not the case in the processes according to the prior art, where this fluid consisted of a noncompressible liquid. Limited radial forces are thus sufficient to ensure that the strip 3 is brought into perfect contact with the roll 4, even at very high speed.

The formation of gas in the vicinity of the surface of the roll 4 can be increased by the electrode 11 placed upstream of the contact zpne 40, which produces a release of gas in the space 24 between the hood 12 and the roll 4, immediately downstream of the latter. This gas release, channeled by the hood 12 into the upstream space is also entrained into the grooves 18 in the roll when the latter rotates at a very high speed. Lastly, the gas held in the grooves 18 is to a large degree maintained in the latter by virtue of the hood 12, and can even be recycled as the diverter roll rotates. Around the roll 4, therefore, there exists a region bounded by the hood 12 and the strip 3, in which the proportion of gas in the liquid is very high and from which only small quantities of the gas can escape. As a general rule, the quantity of gas produced by the electrodes 10 and 11 will merely need to be sufficient to make the entrained fluid compressible.

The process and the device according to the invention have made it possible to attain strip velocities of at least 1000 m/min without the appearance of aquaplaning.

Figure 4:
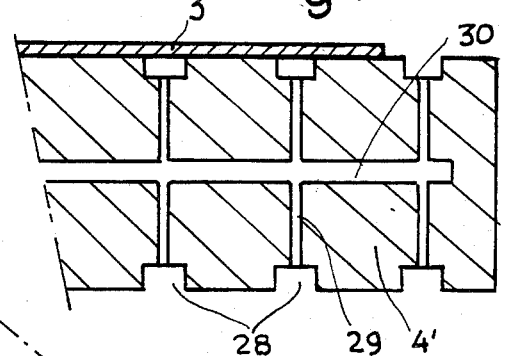
FIG. 4 is a view in partial lengthwise section of a diverting roll of the electrolytic degreasing tank shown in FIG. 3.
Figure 3:
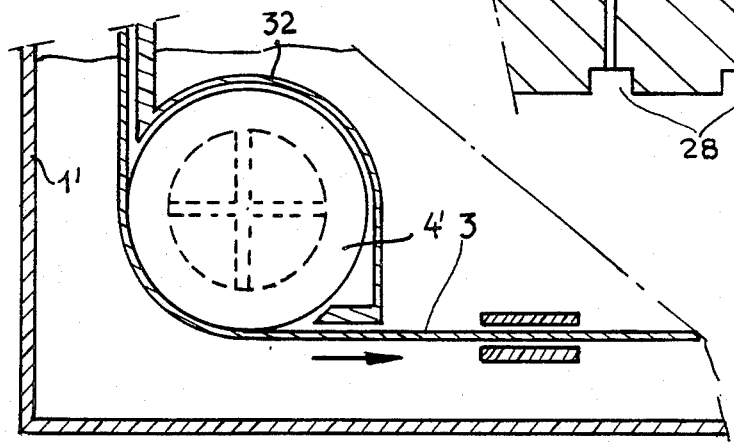
FIG. 3 is a view in cross-section taken in a vertical plane of the entry part of an electrolytic degreasing tank for making use of the process according to the invention and according to a second embodiment.

The electrolytic embodiment just described is especially advantageous in the case of electrolytic treatments, but the invention can also be applied every time when a strip is made to travel at a high speed through a liquid. In fact, it is always possible to introduce a liquid-insoluble gas by direct injection in the vicinity of the roll, so that a sufficient quantity of gas is mixed with the entrained liquid to make it compressible. To this end, the embodiment shown in FIGS. 3 and 4, which show an alternative embodiment 4' of the roll 4, can be used. This consists of a steel cylinder whose side surface which comes into contact with the strip 3 is machined to form circumferential grooves 28, each of which communicates by means of radial channels 29 with an axial channel 30, itself communicating at one of the ends of the roll 4', which is not shown, with a supply of gas which is insoluble in the electrolyte liquid filling the tank 1'. An effect is thus produced which is similar to that obtained by virtue of the device shown in FIGS. 1 and 2, without an electrode corresponding to the electrodes 10 and 11. However, a hood 32 surrounding the roll over the greater part of its side surface which is not covered by the strip 3 must be provided. The fluid filling the grooves 28 is compressible, in fact, by virtue of the introduction of gas through the channels 30 and 29, and the liquid layer which tends to form between the projecting parts of the roll 4' separating the grooves 28 from the strip 3 can be displaced into the grooves 28 by the radial force exerted between the metal strip and the roll 4'.

The gas injection pressure should merely be higher than the hydrostatic pressure at the injection point so that the gas can be released, the flowrate being controlled to make the mixture sufficiently compressible. Care must be taken, of course, to avoid the gas pressure detaching the strip from the roll by an air cushion effect, which would produce an opposite effect to that sought after.

It can be seen that the chief advantages of the process and of the devices according to the invention are to enable the strip to travel at a very high speed through the degreasing tank, without the appearance of aquaplaning, that is to say without loss of adhesion between the strip and the diverting roll or rolls immersed in the degreasing tank.

The invention is not limited to the embodiments which have been described; on the contrary, it comprises all the alternative forms.

Thus, other means and processes for introducing a gas into the liquid in the vicinity of the side contact surface of the diverting roll can be imagined. It is possible, for example, to imagine the use of a single tube supplied with a gas which is insoluble in the electrolyte, opening into the vicinity of the surface of the diverting roll, immediately upstream of this roll.

The roll may have circumferential grooves of any shape, so long as these grooves are distributed over the entire length of the roll which comes into contact with the strip.

Lastly, the process and the device according to the invention may be used not only in the case of electrolytic degreasing of metal strips, but also in the case of cleaning or in the case of any other treatment of a metal strip or a strip of a nonmetallic material passing at a very high speed through a process liquid and coming into contact with at least one diverting roll immmersed in this liquid.

We claim:

1. Process for bringing into contact with a diverting roll a strip traveling at a high speed in a liquid (2) held in a tank (1) equipped with at least one roll for diverting (4) the strip (3), the latter being subjected to a traction and partially enclosing the surface of the roll, a part of the liquid being entrained into the contact zone (40) between the strip (3) and the roll (4), characterized in that a certain quantity of gas which is insoluble in the liquid and capable of mixing with the entrained part of the liquid is introduced in the vicinity of the surface of the roll (4) and at least upstream of the contact zone (40) in the direction of travel, to form a compressible fluid between the strip (3) and the roll (4).

2. Process for bringing into contact according to claim 1, characterized in that the quantity of gas which is introduced is just sufficient to maintain a perfect contact without loss of adhesion between the strip and the roll, by compression of the entrained fluid.

3. Process for bringing into contact according to claim 1, characterized in that the liquid (2) is an electrolyte and the gas is obtained by electrolysis of the liquid (2) in the vicinity of the side surface of the roll (4).

4. Process for bringing into contact according to claim 2, characterized in that the strip (3) is a metal strip.

5. Process for bringing into contact according to claim 1, characterized in that the insoluble gas is injected into the liquid (2) under a pressure which is only slightly greater than the hydrostatic pressure of the liquid (2) at the injection point.

* * * * *